United States Patent [19]
Brown

[11] Patent Number: 5,607,735
[45] Date of Patent: Mar. 4, 1997

[54] HIGH EFFICIENCY DUST SOCK

[75] Inventor: James P. Brown, Smyrna, Ga.

[73] Assignee: Kimberly-Clark Corporation, Neenah, Wis.

[21] Appl. No.: 577,368

[22] Filed: Dec. 22, 1995

[51] Int. Cl.⁶ .......................... B01D 29/11; B01D 46/04; B32B 5/26; B32B 31/26

[52] U.S. Cl. ...................... 428/36.1; 55/528; 55/529; 55/DIG. 5; 156/73.1; 156/73.2; 156/308.4; 428/903; 442/347; 442/362; 442/364

[58] Field of Search ........................... 156/73.1, 73.2, 156/308.4; 428/36.1, 296, 903; 55/528, 529, DIG. 5

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney . | |
| 3,502,763 | 3/1970 | Hartmann | 264/210 |
| 3,542,615 | 11/1970 | Dobo et al. | 156/181 |
| 3,692,618 | 9/1972 | Dorschner et al. . | |
| 3,802,817 | 4/1974 | Matsuki et al. | 425/66 |
| 3,849,241 | 11/1974 | Butin et al. . | |
| 4,041,203 | 8/1977 | Brock et al. | 428/157 |
| 4,340,563 | 7/1982 | Appel et al. | 264/518 |
| 4,374,888 | 2/1983 | Bornslaeger | 428/198 |
| 4,605,454 | 8/1986 | Sayovitz et al. | 156/73.1 |
| 4,787,699 | 11/1988 | Moulin | 350/96.21 |
| 5,108,820 | 4/1992 | Kaneko et al. | 428/198 |
| 5,169,706 | 12/1992 | Collier, IV et al. | 428/152 |
| 5,178,931 | 1/1993 | Perkins et al. | 428/198 |
| 5,200,443 | 4/1993 | Hudson | 524/99 |
| 5,336,552 | 8/1994 | Strack et al. | 428/224 |
| 5,382,400 | 1/1995 | Pike et al. | 264/168 |

*Primary Examiner*—James C. Cannon
*Attorney, Agent, or Firm*—James B. Robinson

[57] ABSTRACT

A dust sock filter medium laminate is provided which has at least two nonwoven webs of microfibers which have an average diameter (using a sample size of at least 10) between about 10 and 25 microns and which webs have been joined by a method comprising the steps of (a) directing the component layers to a separation zone, (b) applying water in the amount of from about 5% to 25% based on the weight of the combined layers, (c) combining the component layers, (d) passing the combination through a sonic bonder operating within the range of up to about 40,000 cps against a patterned anvil to produce a corresponding pattern of thermal bond areas over about 3% to 25% of the surface area of the combination, and, (e) drying the sonically bonded combination.

15 Claims, 1 Drawing Sheet

HIGH EFFICIENCY DUST SOCK

BACKGROUND OF THE INVENTION

This invention relates generally to a nonwoven fabric or web which is formed from spunbond fibers of a thermoplastic resin, and laminates using such a web as a component. The fabric is used as a filter, particularly for industrial applications where the fabric is in the form of a sock.

Thermoplastic resins have been extruded to form fibers, fabrics and webs for a number of years. The most common thermoplastics for this application are polyolefins, particularly polypropylene. Other materials such as polyesters, polyetheresters, polyamides and polyurethanes are also used to form nonwoven spunbond fabrics.

Nonwoven fabrics or webs are useful for a wide variety of applications such as diapers, feminine hygiene products, towels, recreational or protective fabrics and as geotextiles and filter media. The nonwoven webs used in these applications may be simply spunbond fabrics but are often in the form of nonwoven fabric laminates like spunbond/spunbond (SS) laminates or spunbond/meltblown/spunbond (SMS) laminates.

As filter media, some of the desired characteristics of nonwoven fabrics are that they be permeable to the fluid being filtered yet have a high filtration efficiency. Permeability to the fluid being filtered is quite important as low permeability could result in a high pressure drop across the filter requiring a higher, and hence more costly, energy input into the filtered fluid and shortening filter life. In a dust sock application, a fan is generally used to force air through the sock. A sock having low permeability increases the back pressure on the fan and so increases the energy input required to move the same amount of fluid and shortens the fan's life.

High filtration efficiency is, of course, the main purpose for a filter and great efficiency and ability to maintain the efficiency at an acceptable level are key to filter performance.

It is an object of this invention to provide a spunbond polyolefin nonwoven fabric or web for use as a filter medium which has a high permeability and high filtration efficiency. It is a further object of this invention to provide a dust sock filter made from the filter medium.

SUMMARY OF THE INVENTION

The objects of this invention are achieved by a dust sock filter medium laminate which has at least two nonwoven webs of microfibers which have an average diameter (using a sample size of at least 10) between about 10 and 25 microns and which webs have been joined by a method comprising the steps of (a) directing the component layers to a separation zone, (b) applying water in the amount of from about 5% to 25% based on the weight of the combined layers, (c) combining the component layers, (d) passing the combination through a sonic bonder operating within the range of up to about 40,000 cps against a patterned anvil to produce a corresponding pattern of thermal bond areas over about 3% to 25% of the surface area of the combination, and, (e) drying the sonically bonded combination. While this invention is directed mainly to air filtration, other gasses may be filtered as well. The dust socks of this invention desirably have a basis weight between about 85 and 205 gsm, a Frazier permeability of above 100 CFM/SF and an NaCl efficiency above about 60 percent.

BRIEF DESCRIPTION OF THE DRAWING

The FIGURE is a schematic drawing of a dust sock attached to a fan.

DEFINITIONS

Figure 1:
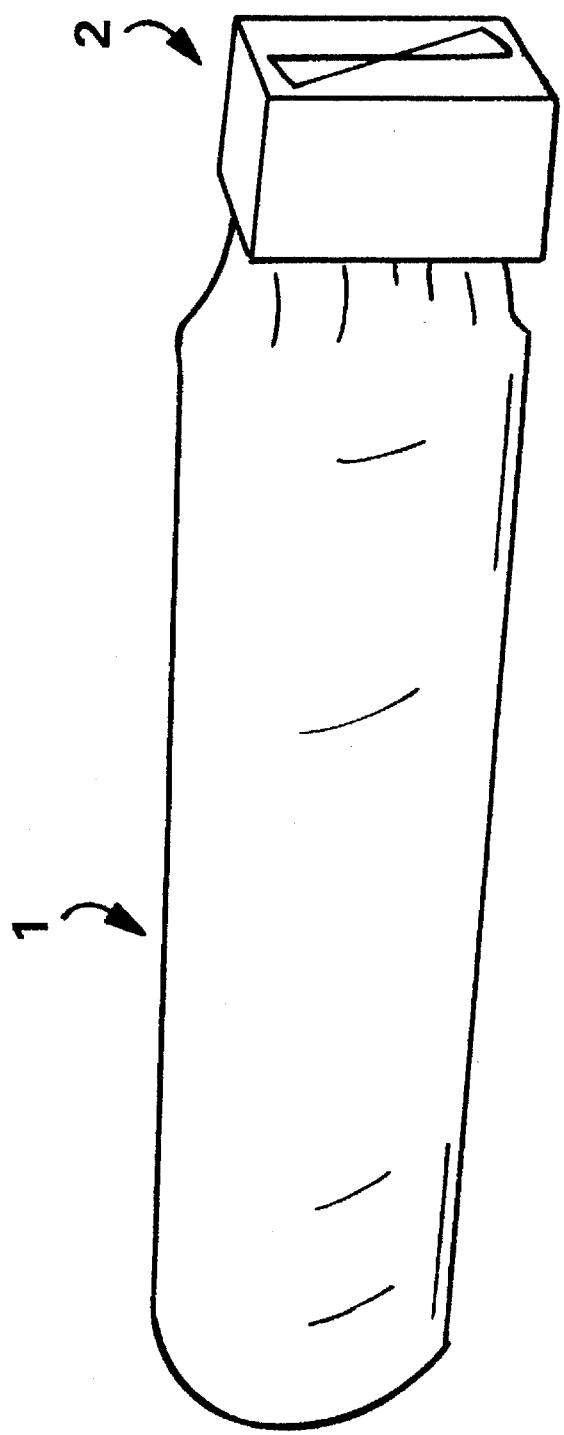

As used herein the term "nonwoven fabric or web" means a web having a structure of individual fibers or threads which are interlaid, but not in an identifiable manner as in a knitted fabric. Nonwoven fabrics or webs have been formed from many processes such as, for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns, Another frequently used expression of fiber diameter is denier, which is defined as grams per 9000 meters of a fiber and may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 = 1.415$). Outside the United States the unit of measurement is more commonly the "tex", which is defined as the grams per kilometer of fiber. Tex may be calculated as denier/9.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (using a sample size of at least 10) larger than 7 microns, more particularly, between about 10 and 25 microns.

As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are microfibers which may be continuous or discontinuous, are generally smaller than 10 microns in average diameter (using a sample size of at least 10), and are generally tacky when deposited onto a collecting surface.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement, a segmented configuration or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein "thermal point bonding" involves passing a fabric or web of fibers to be bonded between a heated calender roll and an anvil roll. The calender roll is usually, though not always, patterned in some way so that the entire fabric is not bonded across its entire surface and the anvil is usually flat. As a result, various patterns for calender rolls have been developed for functional as well as aesthetic reasons. One example of a pattern is the Hansen Pennings or "H&P" pattern with between about a 5 and 50% bond area with between about 50–3200 bonds/square inch as taught in U.S. Pat. No. 3,855,046 to Hansen and Pennings. One example of the H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). Another typical point bonding pattern is the expanded Hansen Pennings or "EHP" bond pattern which produces about a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds and a wire weave pattern looking as the name suggests, e.g. like a window screen. Typically, the percent bonding area varies from around 10% to around 30% of the area of the fabric laminate web. As in well known in the art, the spot bonding holds the laminate layers together as well as imparts integrity to each individual layer by bonding filaments and/or fibers within each layer.

As used herein, "ultrasonic bonding" means a process performed, for example, by passing the fabric between a sonic horn and anvil roll as illustrated in U.S. Pat. No. 4,374,888 to Bornslaeger.

TEST METHODS

Frazier Permeability: A measure of the permeability of a fabric or web to air is the Frazier Permeability which is performed according to Federal Test Standard No. 191A, Method 5450 dated Jul. 20, 1978, and is reported as an average of 3 sample readings. Frazier Permeability measures the air flow rate through a web in cubic feet of air per minute per square foot of web or CFM/SF. Convert CFM/SF to liters per square meter per minute (LSM) by multiplying CFM/SF by 304.8.

NaCl Efficiency: The NaCl Efficiency is a measure of the ability of a fabric or web to stop the passage of small particles through it. A higher efficiency is generally more desirable and indicates a greater ability to remove particles. NaCl efficiency is measured in percent according to the TSI Inc., Model 8110 Automated Filter Tester Operation Manual of February 1993, P/N 1980053, revision D, at a flow rate of 32 liters per minute using 0.1 micron sized NaCl particles and is reported as an average of 3 sample readings. The manual is available from TSI Inc. at PO Box 64394, 500 Cardigan Rd, St. Paul, Minn. 55164. This test also can yield a pressure differential across a fabric using the same particle size and airflow rate.

Melt Flow Rate: The melt flow rate (MFR) is a measure of the viscosity of a polymer. The MFR is expressed as the weight of material which flows from a capillary of known dimensions under a specified load or shear rate for a measured period of time and is measured in grams/10 minutes at a set temperature and load according to, for example, ASTM test 1238-90b.

DETAILED DESCRIPTION

The spunbond process generally uses a hopper which supplies polymer to a heated extruder. The extruder supplies melted polymer to a spinneret where the polymer is fiberized as it passes through fine openings arranged in one or more rows in the spinneret, forming a curtain of filaments. The filaments are usually quenched with air at a low pressure, drawn, usually pneumatically and deposited on a moving foraminous mat, belt or "forming wire" to form the nonwoven web. Polymers useful in the spunbond process generally have a process melt temperature of between about 400° F. to about 610° F. (200° C. to 320° C.).

The fibers produced in the spunbond process are usually in the range of from about 10 to about 50 microns in average diameter, depending on process conditions and the desired end use for the webs to be produced from such fibers. For example, increasing the polymer molecular weight or decreasing the processing temperature results in larger diameter fibers. Changes in the quench fluid temperature and pneumatic draw pressure can also affect fiber diameter. The fibers used in the practice of this invention usually have average diameters in the range of from about 7 to about 35 microns, more particularly from about 15 to about 25 microns.

The fabric of this invention may be a multilayer laminate and may be formed by a number of different techniques including but not limited to using adhesive, needle punching, ultrasonic bonding, thermal calendering and any other method known in the art. Such a multilayer laminate may be an embodiment wherein some of the layers are spunbond and some meltblown such as a spunbond/meltblown/spunbond (SMS) laminate as disclosed in U.S. Pat. No. 4,041,203 to Brock et al. and U.S. Pat. No. 5,169,706 to Collier, et al. or as a spunbond/spunbond laminate. An SMS laminate may be made by sequentially depositing onto a moving conveyor belt or forming wire first a spunbond web layer, then a meltblown web layer and last another spunbond layer and then bonding the laminate in a manner described above. Alternatively, the three web layers may be made individually, collected in rolls, and combined in a separate bonding step.

The fabric may also be a laminate of spunbond fabric and scrim materials. Scrim materials provide little mass and essentially no filtration ability but do provide an additional degree of intregrity or strength to the fabric. Scrims usually are fibers bonded together to produce a square pattern which is quite large, e.g. as much as 5 inches (127 mm) by 5 inches, though the pattern need not be exactly square. Scrims may be, for example, 3 inches (76 mm) by 2 inches (51 mm), 4 inches (101 mm) by 4 inches, and 3 inches (76 mm) by 3 inches. When a scrim is used it should be place between two other layers so that its ability to provide integrity to the fabric is maximized. Scrims may be made from any polymer known conventionally as being used for that purpose, examples include, polypropylene, ethyl vinyl acetate (EVA), polyamides, polyurethane, polybutylene, polystyrene, polyvinyl chloride, polyethylene, polyethylene terephathalate, and polytetrafluoroethylene.

The area in which the web of this invention finds utility is as a dust sock for industrial applications. In such applications, fans are used to move air away from a work area. The air moved by the fan contains particulates which must be removed from the air for safety or environmental reasons. The fans used to move the air are generally a few feet in diameter and are fitted on the discharge side with a long cylindrical fabric "sock" to catch the particles. The FIGURE shows a dust sock (1) attached to a fan (2) and such a sock may be, for example, about 1 to 2 feet (25 to 61 cm) in diameter and about 8 to 15 feet (244 to 915 cm) in length. In the past materials such as cotton and canvas have been used but such materials are quite heavy and do not have the filtration efficiency of the nonwoven fabrics of this invention. The more permeable, higher efficiency fabrics of this invention will allow smaller socks to be used than, for example, a canvas sock, for the same particulate load. Filter fabrics for use in this invention may have basis weights ranging from about 0.25 osy (8.5 gsm) to about 10 osy (340 gsm).

The fibers used to produce the web of this invention maybe conjugate fibers, such as side-by-side (S/S) fibers. The polymers used to produce the fibers are may be polyamides, polyurethane, polybutylene, polyvinylchloride, polytetrafluoroethylene, polystyrene, polyethylene terephathalate, polycarbonates, 4-methyl-1-pentene and polyolefins, particularly polypropylene and polyethylene.

Many polyolefins are available for fiber production, for example polyethylenes such as Dow Chemical's ASPUN® 6811A linear low density polyethylene, 2553 LLDPE and 25355 and 12350 high density polyethylene are such suitable polymers. In addition, the polymers mentioned above for scrim production may be used. The polyethylenes have melt flow rates in g/10 min. at 190° F. and a load of 2.16 kg, of about 26, 40, 25 and 12, respectively. Fiber forming polypropylenes include Exxon Chemical Company's ESCORENE® PD 3445 polypropylene and Himont Chemical Co.'s PF-304 and PF-305. Many other fiber forming polyolefins are commercially available.

The polyamides which may be used in the practice of this invention may be any polyamide known to those skilled in the art including copolymers and mixtures thereof. Examples of polyamides and their methods of synthesis may be found in "Polymer Resins" by Don E. Floyd (Library of Congress Catalog number 66-20811, Reinhold Publishing, N.Y., 1966). Particularly commercially useful polyamides are nylon-6, nylon 6,6, nylon-11 and nylon-12. These polyamides are available from a number of sources such as Nyltech North America of Manchester, N.H., Emser Industries of Sumter, S.C. (Grilon® & Grilamid® nylons) and Atochem Inc. Polymers Division, of Glen Rock. N.J. (Rilsan® nylons), among others.

In addition, a compatible tackifying resin may be added to the extrudable compositions described above to provide tackified materials that autogenously bond. Any tackifier resin can be used which is compatible with the polymers and can withstand the high processing (e.g., extrusion) temperatures. If the polymer is blended with processing aids such as, for example, polyolefins or extending oils, the tackifier resin should also be compatible with those processing aids. Generally, hydrogenated hydrocarbon resins are preferred tackifying resins, because of their better temperature stability. REGALREZ® and ARKON® P series tackifiers are examples of hydrogenated hydrocarbon resins. ZONATAC® 501 lite is an example of a terpene hydrocarbon. REGALREZ® hydrocarbon resins are available from Hercules Incorporated. ARKON® P series resins are available from Arakawa Chemical (USA) Incorporated. The tackifying resins such as disclosed in U.S. Pat. No. 4,787,699, hereby incorporated by reference, are suitable. Other tackifying resins which are compatible with the other components of the composition and can withstand the high processing temperatures, can also be used.

It is also possible to have other materials blended in minor amounts with the polymers used to produce the nonwoven and/or film layer according to this invention like fluorocarbon chemicals to enhance chemical repellency which may be, for example, any of those taught in U.S. Pat. No. 5,178,931, fire retardants, ultraviolet radiation resistance improving chemicals and pigments to give each layer the same or distinct colors. Fire retardants and pigments for spunbond and meltblown thermoplastic polymers are known in the art and are internal additives. A pigment, e.g. $TiO_2$, if used, is generally present in an amount less than 5 weight percentage of the layer while other materials may be present in a cumulative amount less than 25 weight percent.

Ultraviolet radiation resistance improving chemical may be, for example, hindered amines and other commercially available compounds. Hindered amines are discussed in U.S. Pat. No. 5,200,443 to Hudson and examples of such amines are Hostavin TMN 20 from American Hoescht Corporation of Somerville, N.J., Chimassorb® 944 FL from the Ciba-Geigy Corporation of Hawthorne, N.Y., Cyasorb UV-3668 from American Cyanamid Company of Wayne, N.J. and Uvasil-299 from Enichem Americas, Inc. of N.Y.

Dust sock laminates of tills invention may also have topical treatments applied to them for more specialized functions. Such topical treatments and their methods of application are known in the art and include, for example, alcohol repellency treatments, anti-static treatments and the like, applied by spraying, dipping, etc. An example of such a topical treatment is the application of Zelec® antistat (available from E. I. dupont, Wilmington, Del.).

The following sample data numbered 1–6 include a Comparative Example (1), and examples of webs of the Invention (2–5, 7 and 8). The testing was done according to the test methods cited above with the differential pressure being measured as described in the NaCl efficiency test manual.

Sample 1 is a canvas fabric used commercially in the production of dust socks. It has a relatively poor filtration efficiency, high differential pressure and low airflow yet is quite heavy.

Sample 2 is a laminate of two spunbond fabrics, each of which weighed 2.5 osy (85 gsm) with two meltblown layers having a basis weight of 0.5 osy (17 gsm) each, between them. The spunbond was produced from Himont's PF-305 polypropylene and the meltblown from Himont's PF-015. The spunbond layers each included about 1.25 weight percent of Chimassorb® 944 FL and the meltblown layers each included about 1 weight percent of the same chemical. These layers also had a pigment from the Standridge Chemical Corp. of Social Circle, Ga., present in an amount less than 3 weight percent. The particular pigment was SCC-5181 (tan) though SCC-4876 (blue) and SCC-8992 (gray) are also used. A similar laminate of lower basis weight is available as a car cover under the trade name Evolution® 4 fabric from the Kimberly-Clark Corporation of Dallas, Tex.

Sample 3 is a laminate of two spunbond layers, each of which weighed 1.3 osy (44 gsm). The spunbond layers were produced using Himont's PF-305 polypropylene polymer.

Sample 4 is a laminate of two spunbond layers, each of which weighed 1.3 osy (44 gsm), between which there is a 2 osy (68 gsm) spunbond layer of side by side polyethylene/polyproplyene. The outer spunbond layers were produced using Himont's PF-305. The inner spunbond layer was a side-by-side conjugate fabric produced using Himont's PF-305 polypropylene and Dow Chemical's ASPUN® 6811A in a 50/50 ratio.

Sample 5 is a laminate of two spunbond fabrics, each of which weighed 2.5 osy (85 gsm). The spunbond was produced from a Himont's PF-305 polymer.

Sample 6 is an example of a single layer, non-laminated 2.7 osy (92 gsm) fabric. The spunbond was a sheath/core conjugate fiber of Dow Chemical's ASPUN® 6811A polyethylene (sheath) and nylon 6 from Nyltech North America (core).

Sample 7 is a laminate of two 3 osy (102 gsm) layers of conjugate spunbond fabric using the polymers of the inner spunbond layer of sample 4.

Sample 8 is a laminate identical to sample 7 except that it included a 5 inch by 5 inch (127 by 127 mm) scrim fabric between the conjugate spunbond layers. The scrim was an EVA coated polypropylene available from Conwed Plastics Inc., of Minneapolis, Minn.

It should be noted that all laminates were produced according to the procedure of U.S. Pat. No. 4,605,454 to Sayovitz et al., commonly assigned, and incorporated herein by reference in its entirety. This patent teaches a method of forming a composite nonwoven web material having a basis weight in the range of from about 1.5 osy (52 gsm) to 9 osy (306 gsm) from component layers containing thermoplastic fibers, each having a basis weight in the range of from about 0.5 osy (17 gsm) to 3 osy (102 gsm) comprising the steps of (a) directing the component layers to a separation zone, (b) applying water in the amount of from about 5% to 25% based on the weight of the combined layers, (c) combining the component layers, (d) passing the combination through a sonic bonder operating within the range of up to about 40,000 cps against a patterned anvil to produce a corresponding pattern of thermal bond areas over about 3% to 25% of the surface area of the combination, and (e) drying said sonically bonded combination.

TABLE 1

| Sample | Basis Weight (gm) | Frazier Permeability (CFM/SF) | % Efficiency (0.1 um NaCl) | Pressure Differential |
|---|---|---|---|---|
| 1 | 319 | 16 | 25 | 10 |
| 2 | 203 | 18 | 98 | 10 |
| 3 | 88 | 129 | 62 | 1.2 |
| 4 | 159 | 83 | 87 | 1.9 |
| 5 | 166 | 49 | 95 | 3.4 |
| 6 | 92 | NA | 11 | 3 |
| 7 | 203 | 84 | 58 | 1.8 |
| 8 | 231 | 85 | 61 | 1.9 |

The results show that the filter medium laminates of this invention, samples 2–5, 7 and 8, have a good combination of permeability and efficiency and yet are significantly lighter than the commercial canvas fabric now in widespread use. Note that in sample 2, though the Frazier permeability is about the same as the canvas of sample 1, the efficiency is much higher, indicating a lighter fabric could be made having a higher Frazier permeability than canvas yet also having a much higher efficiency than canvas. In particular, the dust sock laminate fabrics of this invention have higher Frazier permeability and higher efficiency than canvas while weighing at least one third less than canvas, i.e., compared to a given canvas fabric, the fabric of this invention will have a higher Frazier permeability and higher NaCl efficiency while weighing about two thirds as much as the canvas. More particularly, it is desired that such dust sock fabrics have an NaCl efficiency above about 60 percent with a basis weight between about 85 and 205 gsm, or still more particularly between about 85 and 170 gsm. It is preferred that the Frazier permeability be above about 100 CFM/SF.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A dust sock filter medium laminate comprising at least two nonwoven webs of microfibers which have an average diameter (using a sample size of at least 10) between about 10 and 25 microns and which webs have been joined by a method comprising the steps of:

(a) directing the component layers to a separation zone, (b) applying water in the amount of from about 5% to 25% based on the weight of the combined layers, (c) combining the component layers, (d) passing the combination through a sonic bonder operating within the range of up to about 40,000 cps against a patterned anvil to produce a corresponding pattern of thermal bond areas over about 3% to 25% of the surface area of the combination, and;

(e) drying said sonically bonded combination.

2. The dust sock filter medium laminate of claim I wherein said microfibers are spunbond fibers.

3. The dust sock filter medium laminate of claim 2 wherein at least one of said microfiber webs of spunbond fibers is comprised of spunbond fibers having a conjugate configuration.

4. The dust sock filter medium laminate of claim 3 wherein said conjugate spunbond fibers are in a side-by-side configuration.

5. The dust sock filter medium laminate of claim 4 wherein said conjugate spunbond fibers are comprised of polypropylene and polyethylene.

6. The dust sock filter medium laminate of claim 3 wherein said conjugate spunbond fibers are in a sheath/core configuration.

7. The dust sock filter medium laminate of claim 3 wherein said conjugate spunbond fibers are comprised of polyolefin and polyamide.

8. The dust sock filter medium laminate of claim 7 wherein said polyolefin is selected from the group consisting of polyethylene and polypropylene.

9. The dust sock filter medium laminate of claim I wherein said laminate has an NaCl efficiency above about 60 percent.

10. The dust sock filter medium laminate of claim I wherein said laminate has a basis weight between about 85 and 205 gsm.

11. The dust sock filter medium laminate of claim 10 wherein said laminate has a basis weight between about 85 and 170 gsm.

12. The dust sock filter medium laminate of claim 1 further comprising a scrim layer between said webs.

13. A dust sock comprised of the fabric of claim 1.

14. A dust sock comprising at least two nonwoven webs of microfibers which have an average diameter (using a sample size of at least 10) between about 10 and 25 microns and which webs have been joined by a method comprising the steps of:

(a) directing the component layers to a separation zone, (b) applying water in the amount of from about 5% to 25% based on the weight of the combined layers, (c) combining the component layers, (d) passing the combination through a sonic bonder operating within the range of up to about 40,000 cps against a patterned anvil to produce a corresponding pattern of thermal bond areas over about 3% to 25% of the surface area of the combination, and;

(e) drying said sonically bonded combination, wherein said dust sock has an NaCl filtration efficiency above about 60 percent, a basis weight between about 85 and 170 gsm and a Frazier permeability above about 100 CFM/SF.

15. The dust sock of claim 14 wherein said microfibers are spunbond polypropylene fibers.

* * * * *